Figure 5:
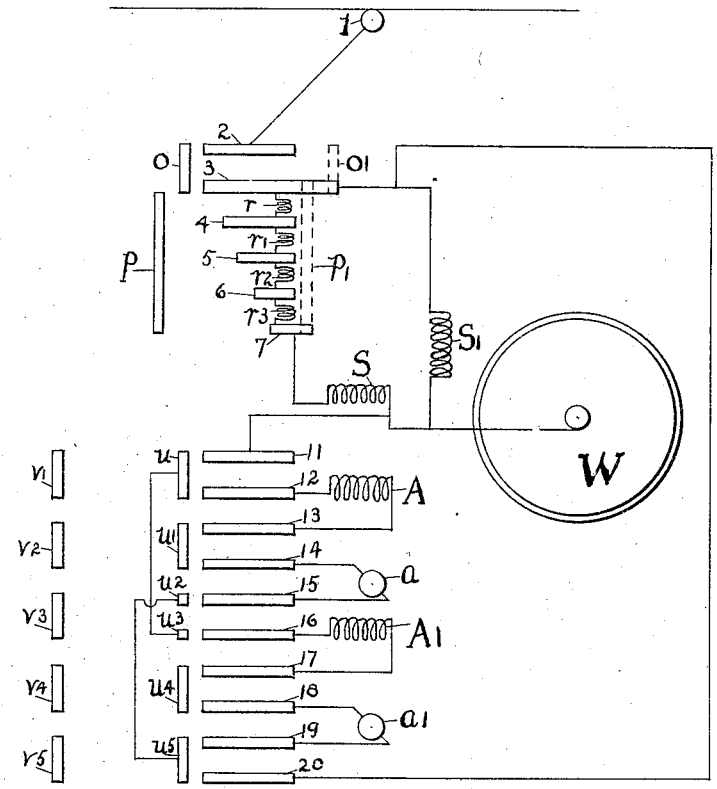

No. 772,143. PATENTED OCT. 11, 1904.
A. GREEN & F. A. STRAIL.
ELECTRIC BRAKE FOR VEHICLES.
APPLICATION FILED SEPT. 3, 1903.
NO MODEL. 2 SHEETS—SHEET 1.
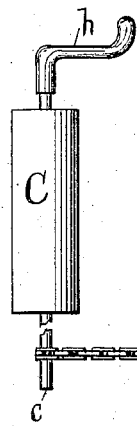
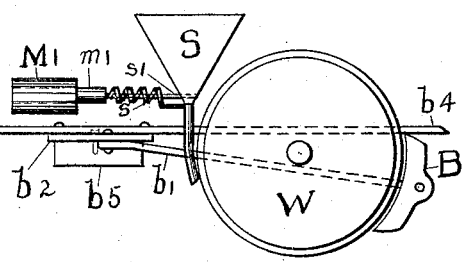
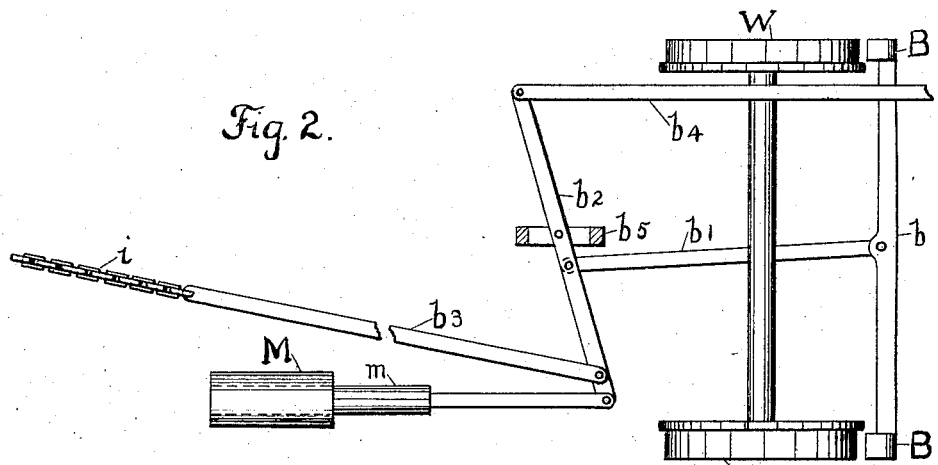
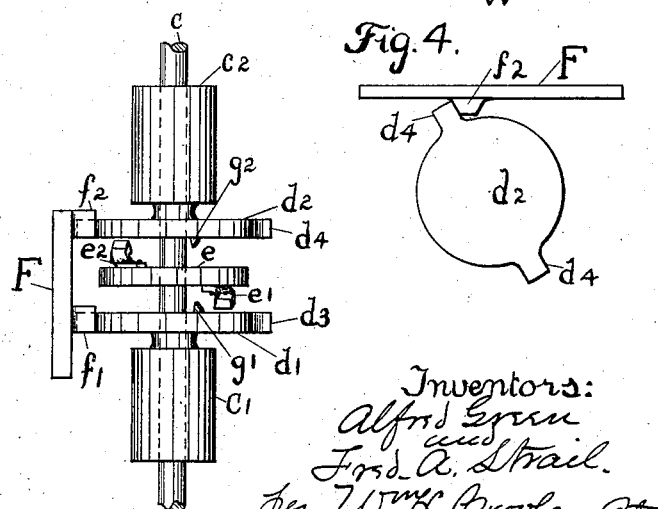
Witnesses:
Osborne F. Gurney
Clara Sieur
Inventors:
Alfred Green and
Fred A. Strail
per W. H. Cooley Atty.

No. 772,143. PATENTED OCT. 11, 1904.
A. GREEN & F. A. STRAIL.
ELECTRIC BRAKE FOR VEHICLES.
APPLICATION FILED SEPT. 3, 1903.
NO MODEL. 2 SHEETS—SHEET 2.

Witnesses:
Osborne J. Gurney
Clara Linner

Inventors:
Alfred Green
Fred. A. Strail
per Wm. H. Cooley atty.

No. 772,143. Patented October 11, 1904.

UNITED STATES PATENT OFFICE.

ALFRED GREEN AND FRED A. STRAIL, OF ROCHESTER, NEW YORK.

ELECTRIC BRAKE FOR VEHICLES.

SPECIFICATION forming part of Letters Patent No. 772,143, dated October 11, 1904.

Application filed September 3, 1903. Serial No. 171,778. (No model.)

*To all whom it may concern:*

Be it known that we, ALFRED GREEN and FRED A. STRAIL, citizens of the United States, residing at Rochester, in the county of Monroe and State of New York, have invented certain new and useful Improvements in Electric Brakes for Vehicles, of which the following is a specification, reference being had to the accompanying drawings, which show in mechanical and electrical diagram only such parts as are necessary to illustrate our invention.

Our present invention relates to electric brakes for vehicles, and more especially that class of vehicles which are supplied with electric energy from a trolley-line or third rail.

One of the principal objects of our invention is to provide means whereby by the operation of the ordinary brake-staff for applying the brakes by hand a controller may be actuated for regulating the supply of electric energy from the trolley or third rail to the exciting-windings of a magnetic braking apparatus and whereby also should there be an interruption in the supply from such trolley or third rail by the still further movement of the operating-handle a second controller is operated so as to supply to the exciting-windings of the magnetic brake electric energy from the motors on the car or vehicle acting, under the momentum of the car, as generators. Again, when the car or vehicle had slowed down to a point where the generative action of the motors is insufficient to apply a braking effort which will completely stop the car or hold it upon a grade a still further motion of the operating-handle will apply the brakes by hand and completely stop and hold the car. It will be understood, of course, that the current is supplied to the braking-coil first from the trolley or third rail and then from the motors operating as generators and also that should either of these sources of electric energy fail the brakes may be applied manually by the operation of the handle in the usual way.

It is preferable in many instances that the magnetic apparatus be connected to the same braking apparatus so as to apply the same braking-shoes to the same braking-surfaces.

Another feature of our present invention consists in means whereby immediately preceding the application of the maximum braking effort by means of the current from the trolley or third rail the usual sand-box valve is opened by means of an electrically-operative mechanism.

A still further feature of our present invention consists in mechanism whereby the following sequence of events is secured by the operation of the usual handle—that is to say, first the current from the trolley or third rail is supplied to the braking-coil through a rheostat, and simultaneously therewith the full potential is applied to the coil of the magnet for opening the sand-box valve, and immediately thereafter the movement of the handle increases to the maximum the braking effort from the trolley or third-rail current. When, however, the maximum effort has been applied by means of the current from the trolley, by cutting out the resistance in the rheostat the controller for controlling the current from the trolley is cut out of circuit and released by the forward movement of the handle, and immediately thereafter a further movement of the handle engages the controller for supplying the current from the motors acting as generators first in parallel and then in series. The current from the motors is also supplied to the coil of the magnet for operating the sand-box valve.

The accompanying drawings, illustrating our invention, are as follows:

Figures 1 and 2 show in mechanical diagram only our invention in side and plan views, respectively. Fig. 3 shows in side view in outline the connections between the brake-staff $c$ and the two controller-cylinders $c'$ and $c^2$. Fig. 4 shows in plan view the means for arresting the motion of the controller-cylinder $c^2$. Fig. 5 shows in an electrical diagram the circuits and connections throughout our system.

Similar characters refer to similar parts throughout the several views.

Referring to Figs. 1 and 2, W represents the wheels of the car or vehicle, against which are arranged to be drawn the brake-shoes B, secured in the usual manner upon the ends of the brake-beam $b$, arranged to receive the usual support and connected, by means of the link $b'$, with the usual equalizing-lever $b^2$, fulcrumed in the block $b^5$ in the usual way. The core $m$ of the magnet M is connected in the usual way to the outer end of the equalizing-lever $b^2$, from the opposite end of which a link $b^4$ extends to the apparatus at the other end of the car, whereby the brakes may be applied from the distant end of the car. A link $b^3$ is also connected to this lever $b^2$ and by means of a chain $i$ to the lower end of the brake-staff $c$ in the usual way.

The sand-box S has a valve $s'$ at the bottom thereof connected to the core $m'$ of the magnet M′ in such a way that the energizing of such magnet M′ opens the valve $s'$ of the sand-box S against the action of the spring $s$, which serves normally to close this valve $s'$. The energizing of the magnet M serves to apply the brakes electrically by means of connections between the core $m$ and the brake-beam $b$, as already described.

Built around and inclosing the brake-staff $c$ is seen a controller C, the mechanical details of which are such, as will be explained, as to secure the above-mentioned sequence of events from the operation of such staff $c$ by the movement of the usual handle $h$ at the upper end thereof. Referring to Figs. 3 and 4, loosely supported by this brake-staff $c$ and in such a way as to be revoluble independently thereof, are seen the cylinders $c'$ and $c^2$, connected in turn to the operating-disks $d'$ and $d^2$, respectively. Secured upon this staff $c$ and rotatable therewith is seen the disk $e$, carrying spring-arms $e'$ and $e^2$, arranged to engage, respectively, operating projections $g'$ and $g^2$, as seen on the upper side of the disk $c'$ and on the under side of the disk $d^2$, in such a way that the rotation of the staff $c$ causes the rotation of first one and then the other of these cylinders $c'$ and $c^2$. Upon the back side of the case F for the controller C are seen projections $f'$ and $f^2$, arranged to be engaged by radially-projecting arms on the disks $d'$ and $d^2$, respectively. The angular location of the operating projections $g'$ and $g^2$ on the disks $d'$ and $d^2$ relatively to the location of the spring-arms $e'$ and $e^2$ on the disk $e$ is such that, viewing the parts as seen in Fig. 3, about one-quarter of a revolution of the staff $c$ in the usual right-handed direction brings the arm $e^2$ against projection $g^2$, from which point onward the rotation of the staff $c$ causes a rotation of disk $d^2$ and cylinder $c^2$, attached thereto, until one of the radially-projecting arms $d^4$ on the disk $d^2$ engages the stop $f^2$ on the back F of the controller. Then by a further rotation of the staff $c$ the spring-arm $e^2$ is forced downward and under and past the projection $g^2$, permitting a further rotation of the staff $c$, and at this same time the arm $e'$ is brought into engagement with the projection $g'$ on disk $d'$, causing a forward rotation of the same until such forward rotation of the cylinder $c'$ and disk $d'$ is arrested by the engagement of one of the radial arms $d^3$ on the disk $d'$ against a stop $f'$ on the back F of the controller, at which time the spring-arm $e'$ may be caused by a further rotation of the staff $c$ to ride over the projection $g'$ on disk $d'$, when the further rotation of the staff $c$ by the handle $h$ will apply the brakes by hand in the usual way, the slack of the chain $i$ being sufficient to permit of the amount of rotation just described necessary for the operation of the two controllers before the forcible application of the brakes by hand begins.

Referring to Fig. 5, 1 represents the trolley, 2 a contact connected thereto, 3, 4, 5, 6, and 7 successive contacts of a rheostat consisting of resistances $r$, $r'$, $r^2$, and $r^3$. $o$ and $p$ represent contacts carried by the cylinder $c^2$. S and S′ represent, respectively, the coil for magnets M and M′. W represents the wheel through which connection is secured to ground, as indicated. By the operation, then, of the cylinder $c^2$, carrying connecting-bars $o$ and $p$, first the trolley-circuit is connected to ground in the usual way through the sand-box-valve-operating magnet S′ and in parallel therewith also through the resistance $r$, $r'$, $r^2$, and $r^3$ in series with the braking-magnet coil S. The forward movement of the handle $h$, carrying with it the cylinder $c^2$, results in first cutting out the several resistances and impressing upon the coil S the full potential of the current from the trolley 1, and a still further movement of the handle $h$, causing the parts $o$ and $p$ to occupy the positions indicated in dotted lines at $o'$ and $p'$, results in cutting out or opening the trolley-circuit at the time when the cylinder $c^2$ is prevented from further forward rotation by an arm $d^4$ on the disk $d^2$ engaging the stop $f^2$. A further forward motion of the handle $h$ results, then, in the rotation of the cylinder $c'$, carrying connecting-bars $u$, $u'$, $u^2$, $u^3$, $u^4$, and $u^5$, all arranged in a vertical row, so as to engage the contacts 11, 12, 13, 14, 15, 16, 17, 18, 19, and 20 simultaneously. Contact-bars $u$ and $u^3$ are connected together, and contact-bars $u^2$ and $u^5$ are connected together. A and A′ represent the field-coils of the two motors on the car, and $a$ and $a'$ represent the armatures, respectively, of such motors. The operation of the cylinder $c'$ results, then, it will at once be understood, in connecting the motors in parallel between contacts 11 and 20 and in connecting such motors when thus in parallel in a series circuit with the brake-coil S and the sand-box-valve-operating coil S′ in parallel therewith between the contacts 11 and 20. The contact-strip $p$ when in the position indicated in dotted lines at $p'$ serves to complete the circuit for the motors and the brake-magnet coil S in series therewith. A still further rotation of the cylinder $c'$, causing the contacts $v'$, $v^2$, $v^3$, $v^4$, and $v^5$ to engage in the manner indicated the several contacts 11, 12, 13, 14, 15, 16, 17, 18, 19, and 20, results in connecting the motors together in series between the contacts 11 and 20, and thereby impressing upon the coils S and S' the full potential generated by the motors in series. It will of course be understood that the contacts $u$, $u'$, $u^2$, $u^3$, $u^4$, and $u^5$ have been moved far enough to the right in Fig. 5 to be disengaged from the contacts 11, 12, 13, 14, 15, 16, 17, 18, 19, and 20 before the contacts $v'$, $v^2$, $v^3$, $v^4$, and $v^5$ are brought into contact therewith.

In the operation of our brake there is allowed a sufficient slack of the chain $i$ for a little over one rotation of the handle $h$ before the forcible application of the brakes by hand. This permits of half a rotation for each of the cylinders $c'$ and $c^2$, resulting, as already described, in first impressing upon the coils S and S' the full potential of the current from the trolley 1 and then in cutting out the trolley-circuit and impressing upon the coils S and S' first the full potential of the motors on the car connected up in parallel and then the full potential of such motors connected up in series. When the car has slowed down to that point where the generative action is sufficient to apply an appreciable braking effort through the generative action of the motors, the further motion of the handle $h$ applies the brake by hand, so as to bring the car to a full stop and hold it upon a grade. The backward motion of the handle $h$ first releases the hand-applied brakes and then returns first the cylinder $c'$ to its initial position and then the cylinder $c^2$ to its initial position, the conformation of the spring-arms $e'$ and $e^2$ being such as to operate the disks $d'$ and $d^2$, respectively, equally well for a rotation of the staff $c$ in either direction. The oppositely-located radial projection $d^3$ and $d^4$ on the disks $d'$ and $d^2$ serve to properly limit the motion in each direction of the disks $d'$ and $d^2$ by engaging stops $f'$ and $f^2$. The usual means may be used for retaining disks $d'$ and $d^2$ (when not otherwise operated upon) in any one of the positions to which they have been driven.

It will of course be understood that when our invention is used upon a car having only one motor the braking-coil will be connected in series with that one motor by the operation of the second controller.

I claim—

1. A braking system for a vehicle comprising the following elements, viz. a trolley-circuit, an operating-handle for applying the brakes by hand, a first electromagnet for applying the brakes electrically, a sand-box having a valve therein and a second electromagnet for operating such valve and a spring for holding such valve normally closed, means whereby the motion of such handle first cuts into circuit with the trolley the exciting-windings of such second magnet, and also the exciting-windings of such first magnet through a resistance which is gradually cut out by the forward movement of such handle, means whereby a further movement of such handle cuts out the trolley-circuit and connects the exciting-windings of such magnets in series with the armatures of the motors on the car but first in parallel and then in series with each other and means whereby the still further movement of such handle applies the brakes by hand.

2. A braking system for a vehicle comprising the following elements, viz. a trolley-circuit, an operating-handle for applying the brakes by hand, an electromagnet for applying the brakes electrically, means whereby the motion of such handle first cuts into circuit with the trolley the exciting-windings of such magnet through a resistance which is gradually cut out by the forward movement of such handle, means whereby a further movement of such handle cuts out the trolley-circuit and connects the exciting-windings of such magnet in series with the armatures of the motors on the car but first in parallel and then in series with each other and means whereby the still further movement of such handle applies the brakes by hand.

3. A braking system comprising the following elements, viz., a trolley-circuit, an operating-handle for applying the brakes by hand, a first electromagnet for applying the brakes electrically, a sand-box having a valve therein and a second electromagnet for operating such valve, a spring for normally holding such valve closed, a first controller for regulating the supply of the electric energy from the trolley to the exciting-windings of such first magnet, such first controller also for each of its operative positions arranged to impress upon the exciting-windings of such second magnet the full potential of the trolley-current, a second controller arranged to connect the exciting-windings of such magnets in series with the armatures of the motors on the car but first in parallel and then in series with each other and means whereby the movement of such operating-handle first actuates such first controller and then releases it and then actuates such second controller and then releases it and applies the brakes by hand.

4. A braking system comprising the following elements, viz., a trolley-circuit, an operating-handle for applying the brakes by hand, an electromagnet for applying the brakes electrically, a first controller for regulating the supply of the electric energy from the trolley to the exciting-windings of such magnet, a second controller arranged to connect the exciting-windings of such magnet in series with the armatures of the motors on the car, but first in parallel and then in series with each other and means whereby the movement of such operating-handle first actuates such first controller and then releases it and then actuates such second controller and then releases it and applies the brakes by hand.

5. A braking system for a vehicle comprising the following elements, viz., a trolley-circuit, an operating-handle for applying the brakes by hand, a first electromagnet for applying the brakes electrically, a sand-box having a valve therein, a second electromagnet for operating such valve and a spring for holding such valve normally closed, means whereby the motion of such handle first cuts into circuit with the trolley the exciting-windings of such second magnet, and also the exciting-windings of such first magnet through a resistance which is gradually cut out by the forward movement of such handle, means whereby a further movement of such handle cuts out the trolley-circuit and connects the exciting-windings of such magnets in series with the armature or armatures of the motor or motors on the car and means whereby the still further movement of such handle applies the brakes by hand.

6. A braking system for a vehicle comprising the following elements, viz. a trolley-circuit, an operating-handle for applying the brakes by hand, an electromagnet for applying the brakes electrically, means whereby the motion of such handle first cuts into circuit with the trolley the exciting-windings of such magnet through a resistance which is gradually cut out by the forward movement of such handle, means whereby a further movement of such handle cuts out the trolley-circuit and connects the exciting-windings of such magnet in series with the armature or armatures of the motor or motors on the car and means whereby the still further movement of such handle applies the brakes by hand.

7. A braking system comprising the following elements, viz., a trolley-circuit, an operating-handle for applying the brakes by hand, a first electromagnet for applying the brakes electrically, a sand-box having a valve therein and a second electromagnet for operating such valve, a spring for normally holding such valve closed, a first controller for regulating the supply of the electric energy from the trolley to the exciting-windings of such first magnet, such first controller also for each of its operative positions arranged to impress upon the exciting-windings of such second magnet the full potential of the trolley-current, a second controller arranged to connect the armature or armatures of the motor or motors on the car in series with the exciting-windings of such magnets and means whereby the movement of such operating-handle first actuates such first controller and then releases it and then actuates such second controller and then releases it and applies the brakes by hand.

8. A braking system comprising the following elements, viz., a trolley-circuit, an operating-handle for applying the brakes by hand, an electromagnet for applying the brakes electrically, a first controller for regulating the supply of the electric energy from the trolley to the exciting-windings of such magnet, a second controller arranged to connect the armature or armatures of the motor or motors on the car in series with the exciting-windings of such magnet and means whereby the movement of such operating-handle first actuates such first controller and then releases it and then actuates such second controller and then releases it and applies the brakes by hand.

9. A braking system for a vehicle comprising the following elements, viz. a trolley-circuit, an operating-handle for applying the brakes by hand, a first electromagnet for applying the brakes electrically, a sand-box having a valve therein and a second electromagnet for operating such valve and a spring for holding such valve normally closed, means whereby the motion of such handle first cuts into circuit with the trolley the exciting-windings of such second magnet, and also the exciting-windings of such first magnet through a resistance which is gradually cut out by the forward movement of such handle, means whereby a further movement of such handle cuts out the trolley-circuit and connects the exciting-windings of such magnets in series with the armatures of the motors on the car but first in parallel and then in series with each other, means whereby the still further movement of such handle applies the brakes by hand, and means operating throughout that motion of the handle preceding the application of the brakes by the hand-operated mechanism to take up the slack in such hand-operated mechanism.

10. A braking system for a vehicle comprising the following elements, viz. a trolley-circuit, an operating-handle for applying the brakes by hand, an electromagnet for applying the brakes electrically, means whereby the motion of such handle first cuts into circuit with the trolley the exciting-windings of such magnet through a resistance which is gradually cut out by the forward movement of such handle, means whereby a further movement of such handle cuts out the trolley-circuit and connects the exciting-windings of such magnet in series with the armatures of the motors on the car but first in parallel and then in series with each other, means whereby the still further movement of such handle applies the brakes by hand, and means operating throughout that motion of the handle preceding the application of the brakes by the hand-operated mechanism to take up the slack in such hand-operated mechanism.

11. A braking system comprising the following elements, viz. a trolley-circuit, an operating-handle for applying the brakes by hand, a first electromagnet for applying the brakes electrically, a sand-box having a valve therein and a second electromagnet for operating such valve, a spring for normally holding such valve closed, a first controller for regulating the supply of the electric energy from the trolley to the exciting-windings of such first magnet, such first controller for each of its operative positions arranged to impress upon the exciting-windings of such second magnet the full potential of the trolley-current, a second controller arranged to connect the exciting-windings of such magnets in series with the armatures of the motors on the car but first in parallel and then in series with each other, means whereby the movement of such operating-handle first actuates such first controller and then releases it and then actuates such second controller and then releases it and applies the brakes by hand, and means operating throughout that motion of the handle preceding the application of the brakes by the hand-operated mechanism to take up the slack in such hand-operated mechanism.

12. A braking system comprising the following elements, viz. a trolley-circuit, an operating-handle for applying the brakes by hand, an electromagnet for applying the brakes electrically, a first controller for regulating the supply of the electric energy from the trolley to the exciting-windings of such magnet, a second controller arranged to connect the exciting-windings of such magnet in series with the armatures of the motors on the car, but first in parallel and then in series with each other, means whereby the movement of such operating-handle first actuates such first controller and then releases and then actuates such second controller and then releases it and applies the brake by hand, and means operating throughout that motion of the handle preceding the application of the brakes by the hand-operated mechanism to take up the slack in such hand-operated mechanism.

13. A braking system for a vehicle comprising the following elements, viz. a trolley-circuit, an operating-handle for applying the brakes by hand, a first electromagnet for applying the brakes electrically, a sand-box having a valve therein, a second electromagnet for operating such valve and a spring for holding such valve normally closed, means whereby the motion of such handle first cuts into circuit with the trolley the exciting-windings of such second magnet, and also the exciting-windings of such first magnet through a resistance which is gradually cut out by the forward movement of such handle, means whereby a further movement of such handle cuts out the trolley-circuit and connects the exciting-windings of such magnets in series with the armature or armatures of the motor or motors on the car, means whereby the still further movement of such handle applies the brakes by hand, and means operating throughout that motion of the handle preceding the application of the brakes by the hand-operated mechanism to take up the slack in such hand-operated mechanism.

14. A braking system for a vehicle comprising the following elements, viz. a trolley-circuit, an operating-handle for applying the brakes by hand, an electromagnet for applying the brakes electrically, means whereby the motion of such handle first cuts into circuit with the trolley the exciting-windings of such magnet through a resistance which is gradually cut out by the forward movement of such handle, means whereby a further movement of such handle cuts out the trolley-circuit and connects the exciting-windings of such magnet in series with the armature or armatures of the motor or motors on the car, means whereby the still further movement of such handle applies the brakes by hand, and means operating throughout that motion of the handle preceding the application of the brakes by the hand-operated mechanism to take up the slack in such hand-operated mechanism.

15. A braking system comprising the following elements, viz. a trolley-circuit, an operating-handle for applying the brakes by hand, a first electromagnet for applying the brakes electrically, a sand-box having a valve therein and a second electromagnet for operating such valve, a spring for normally holding such valve closed, a first controller for regulating the supply of the electric energy from the trolley to the exciting-windings of such first magnet, such first controller also for each of its operative positions arranged to impress upon the exciting-windings of such second magnet the full potential of the trolley-current, a second controller arranged to connect the armature or armatures of the motor or motors on the car in series with the exciting-windings of such magnets, means whereby the movement of such operating-handle first actuates such first controller and then releases it and then actuates such second controller and then releases it and applies the brakes by hand, and means operating throughout that motion of the handle preceding the application of the brakes by the hand-operated mechanism to take up the slack in such hand-operated mechanism.

16. A braking system comprising the following elements, viz. a trolley-circuit, an operating-handle for applying the brakes by hand, an electromagnet for applying the brakes electrically, a first controller for regulating the supply of the electric energy from the trolley to the exciting-windings of such magnet, a second controller arranged to connect the armature or armatures of the motor or motors on the car in series with the exciting-windings of such magnet and means whereby the movement of such operating-handle first actuates such first controller and then releases it and then actuates such second controller and then releases it and applies the brakes by hand, and means operating throughout that motion of the handle preceding the application of the brakes by the hand-operated mechanism to take up the slack in such hand-operated mechanism.

17. In a braking system in combination with a supply-circuit an electromagnet for operating the brakes, resistances for regulating the potential of the current supplied to such electromagnet, a sand-box having a valve therein and an electromagnet with its movable member connected to such valve, means for supplying to such last-named electromagnet electric energy in parallel with a circuit containing the exciting-windings of such first-named magnet and the resistances in series therewith and means for gradually cutting out such resistances.

ALFRED GREEN.
FRED A. STRAIL.

Witnesses:
CLARA M. SIENER,
OSBORNE F. GURNEY.